(12) United States Patent
Gremplini et al.

(10) Patent No.: US 8,905,215 B2
(45) Date of Patent: Dec. 9, 2014

(54) CLUTCH ARRANGEMENT, MOTOR VEHICLE DRIVE TRAIN AND CLUTCH ACTIVATION METHOD

(75) Inventors: Hansi Gremplini, Ingersheim (DE); Guenter Ruehle, Loechgau (DE); Jochen Bausch, Bietgheim (DE)

(73) Assignee: Getrag Getriebe- und Zahnradfabrik Hermann Hagenmeyer GmbH & Cie KG, Untergruppenbach (DE)

(*) Notice: Subject to any disclaimer, the term of this patent is extended or adjusted under 35 U.S.C. 154(b) by 132 days.

(21) Appl. No.: 13/604,591

(22) Filed: Sep. 5, 2012

(65) Prior Publication Data

US 2013/0056322 A1   Mar. 7, 2013

(30) Foreign Application Priority Data

Sep. 6, 2011   (DE) .................. 10 2011 113 278

(51) Int. Cl.
*F16D 25/08* (2006.01)
*F16D 23/14* (2006.01)
*F16D 23/12* (2006.01)

(52) U.S. Cl.
CPC .............. *F16D 25/087* (2013.01); *F16D 23/12* (2013.01)
USPC ................... 192/70.22; 192/85.35; 192/85.51; 192/92; 192/114 R; 192/114 T

(58) Field of Classification Search
CPC ............................................... F16D 2021/0676
USPC ............................ 192/92, 70.22, 85.35, 114 T
See application file for complete search history.

(56) References Cited

U.S. PATENT DOCUMENTS

| 2,149,262 A | * | 3/1939 | Ahler ........................ 192/114 R |
| 5,413,201 A | * | 5/1995 | Vidal ......................... 192/114 R |
| 5,535,869 A | * | 7/1996 | Bigley et al. .............. 192/114 R |

FOREIGN PATENT DOCUMENTS

| DE | 196 48 481 A1 | 5/1998 |
| DE | 199 17 724 A1 | 11/2000 |
| DE | 102 05 411 A1 | 8/2003 |
| DE | 10 2007 023 955 A1 | 11/2008 |
| DE | 10 2008 013 054 A1 | 9/2009 |
| DE | 20 2008 013 348 U1 | 4/2010 |
| EP | 1 388 682 A1 | 2/2004 |
| FR | 2 567 224 A1 | 1/1986 |
| FR | 2 900 708 A1 | 11/2007 |

OTHER PUBLICATIONS

Search Report for European Application No. 12182967.5 dated Dec. 3, 2012 in 5 pages.

* cited by examiner

*Primary Examiner* — Rodney H Bonck
(74) *Attorney, Agent, or Firm* — Knobbe Martens Olson & Bear, LLP

(57) ABSTRACT

A clutch arrangement for connecting two components, which can rotate relative to one another, of a motor vehicle drive train, in particular for connecting two shafts of a transmission or a shaft to an idler gear rotatably mounted on the shaft. The clutch arrangement has a clutch and an actuator arrangement. The clutch is opened in a first actuator position of an actuator section of the actuator arrangement. The clutch arrangement has a locking device for locking the actuator section in a locked position to keep the clutch closed. The locking device has a slotted-link guide with a first guide section and a second guide section for the actuator section, wherein the locked position can be reached from the first actuator position via the first guide section, and wherein the first actuator position can be reached from the locked position via the second guide section.

19 Claims, 5 Drawing Sheets

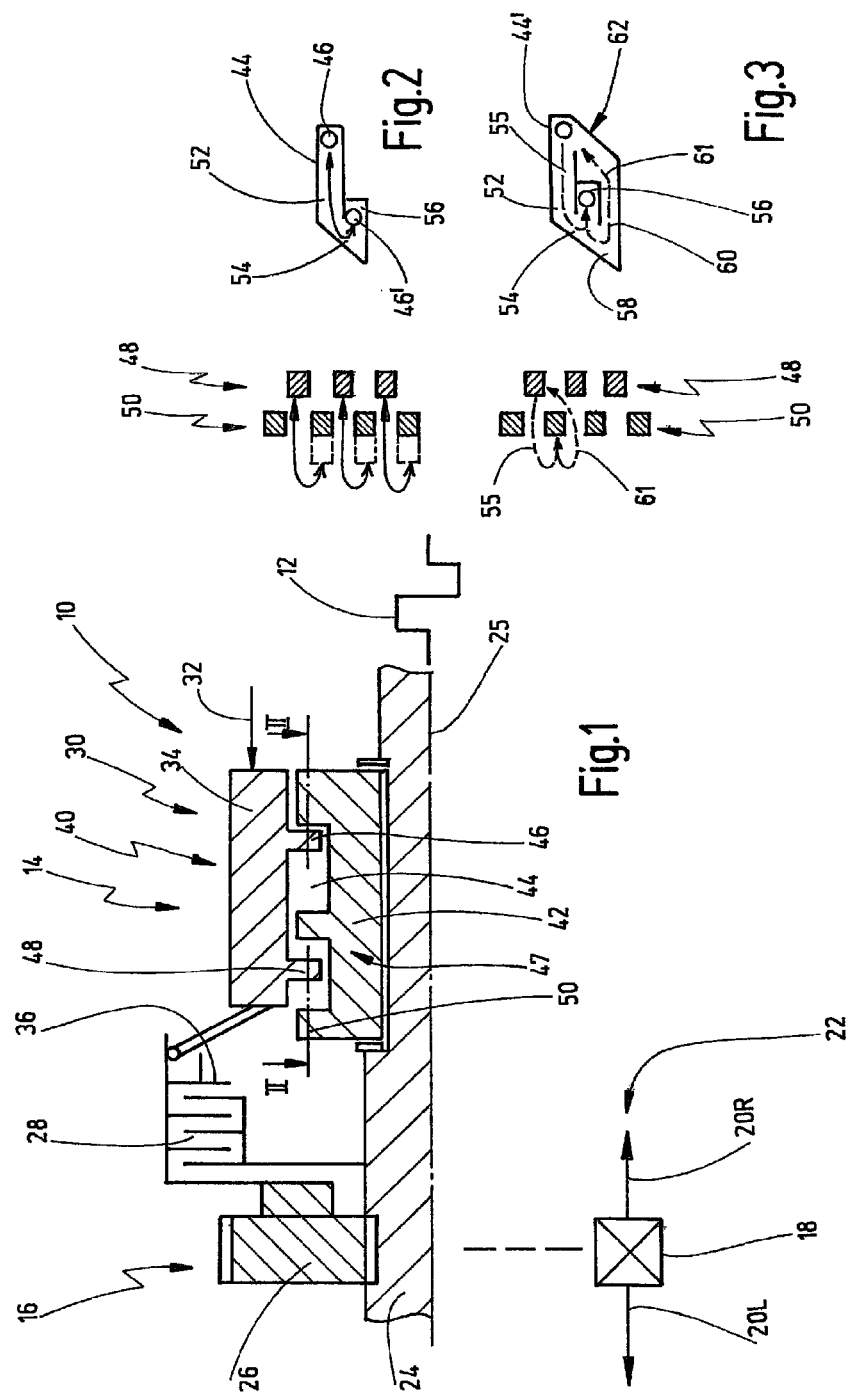

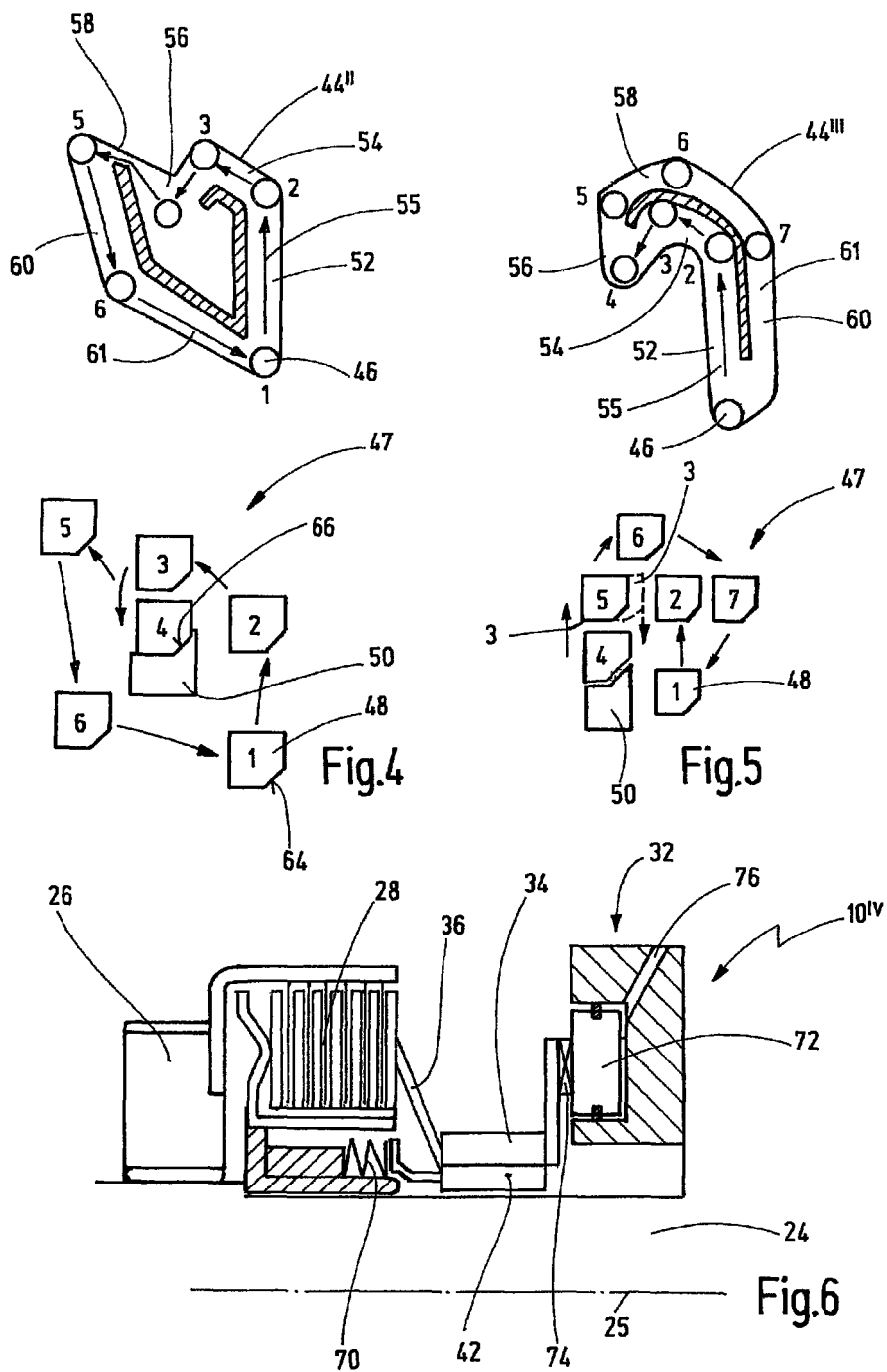

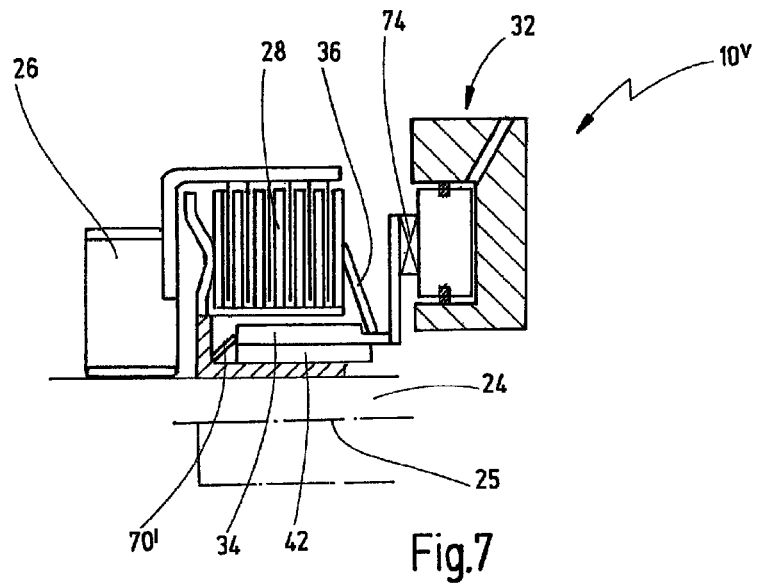
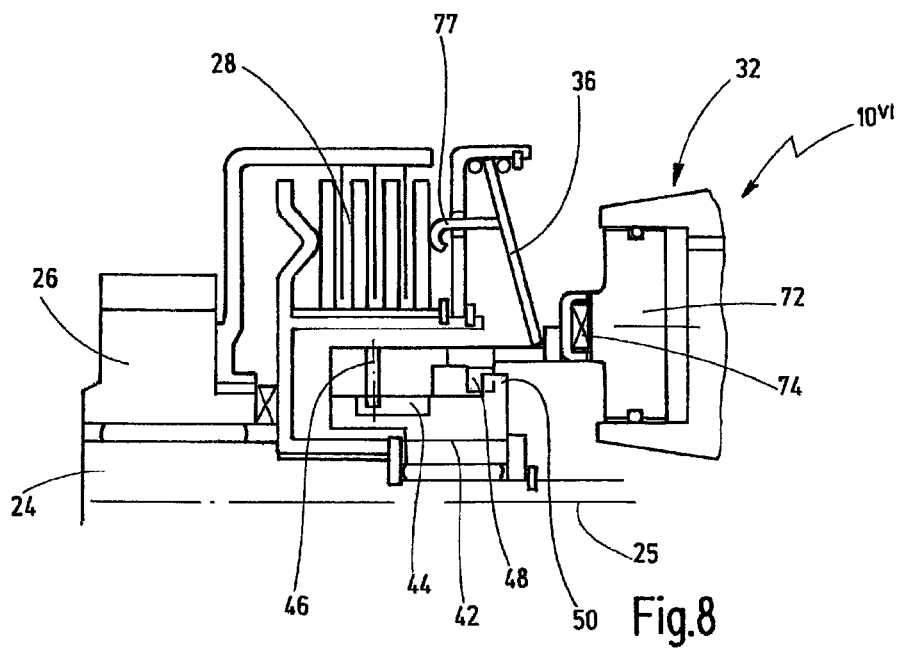

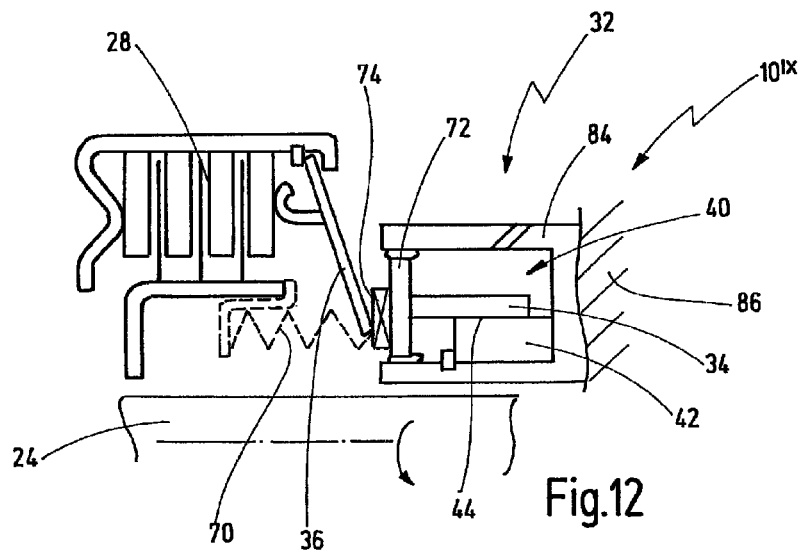
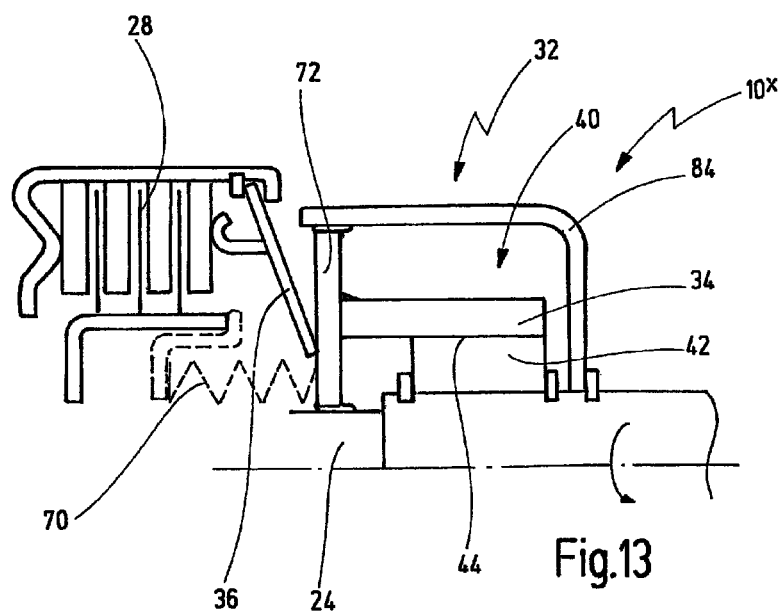

CLUTCH ARRANGEMENT, MOTOR VEHICLE DRIVE TRAIN AND CLUTCH ACTIVATION METHOD

CROSS REFERENCE TO RELATED APPLICATIONS

This application claims the priority of German Patent Application DE 10 2011 113 278, filed Sep. 6, 2011.

BACKGROUND OF THE INVENTION

The present invention relates to a clutch arrangement for connecting two components, which can rotate relative to one another, of a motor vehicle drive train, in particular for connecting two shafts of a motor vehicle transmission or a shaft to an idler gear which is rotatably mounted on the shaft, having a clutch, having an actuator arrangement for activating the clutch, wherein the clutch is opened in a first actuator position of an actuator section of the actuator arrangement, and having a locking device for locking the actuator section in a locked position, in order to keep the clutch closed.

In addition, the present invention relates to a motor vehicle drive train having such a clutch arrangement and to a method for activating a clutch arrangement which has a clutch, an actuator arrangement and a locking device.

Clutch arrangements of the type mentioned at the beginning can be used, for example, as separating clutch arrangements in double clutch transmissions, wherein the clutch arrangement is arranged between a drive motor and a variable speed step transmission having a plurality of gearspeeds, and wherein the variable speed step transmission has two component transmissions here. Each component transmission is assigned different gearspeeds, wherein as a rule one of the component transmissions is assigned the even-numbered gearspeed stages, and as a rule the other component transmission is assigned the odd-numbered gearspeed stages.

A clutch arrangement of the type mentioned above can be used for a drive train in which the drive motor is formed by an electric motor and in which the transmission has only two gearspeed stages, as in the document DE 199 17 724 A1 mentioned above. In this context, two clutch arrangements are provided which serve to shift either the one gearspeed stage or the other gearspeed stage into the power flux to a differential of a driven axle.

Clutch arrangements of the type mentioned at the beginning are, however, also suitable for securing brakes and/or parking brakes.

The clutch of the clutch arrangement is preferably embodied as a friction clutch, in particular as a wet-running multi-disc clutch. However, the clutch can also be embodied as a dry friction clutch.

In motor vehicle drive trains, clutch arrangements of the type mentioned at the beginning are as a rule activated in an automated fashion by means of actuator arrangements.

SUMMARY OF THE INVENTION

However, the devices for setting and releasing the locking devices are relatively complex. An object of the invention is therefore to specify an improved clutch arrangement, an improved drive train and an improved method for activating a clutch arrangement which are less complex to implement.

This object is achieved with the clutch arrangement specified at the beginning by virtue of the fact that the locking device has a slotted-link guide with a first guide section and a second guide section for the actuator section, wherein the locked position can be reached from the first actuator position via the first guide section, and wherein the first actuator position can be reached from the locked position via the second guide section.

In addition, the above object is achieved by means of a motor vehicle drive train having such a clutch arrangement.

Finally, the above object is achieved by means of a method for activating a clutch arrangement, in particular of the type described above, wherein the clutch arrangement has a clutch, an actuator arrangement for automatically activating the clutch and a locking device for locking an actuator section of the actuator arrangement in a locked position, having the steps of moving the actuator section in a forward direction beyond a closed position, from which on the clutch is closed, in order to bring about the locked position.

As a result of the measure of assigning the locking device a slotted-link guide which has different guide sections it is possible for the processes of bringing about the locked position and of exiting the locked position to be implemented differently. As a result, undesired hysteresis phenomena during the bringing about and exiting of the locked position can be avoided.

The clutch is, in particular, a friction clutch, for example a wet-running multi-disc clutch or a dry friction clutch. As a friction clutch the clutch is preferably configured as a power-shiftable clutch, with the result that the clutch can be opened or closed even if a torque is applied.

In addition, the clutch is preferably a normally open (pressureless) clutch which can be placed in the closed position by means of the actuator arrangement by applying an actuator force.

In the locked position, the clutch is kept closed. This has the advantage that in the case of a normally open clutch an operating state can be reached in which the clutch is closed and at the same time no energy or minimum energy has to be fed to the actuator arrangement.

The locked position is preferably self-securing and can in this context preferably absorb forces which are typical of a clutch (for example up to 5 kN, preferably up to 10 kN, in particular up to approximately 25 kN). In addition, the locking device is preferably configured also to withstand relatively high frequency oscillations (up to, for example, 20 kHz) about this force, such as typically occur in the surroundings of drive trains of motor vehicles.

The slotted-link guide is preferably formed on a component of the locking device which is separate from the actuator section. In addition, a driver of the actuator section preferably engages in the slotted-link guide.

The slotted-link guide is preferably configured here in such a way that the locked position can be reached from the first actuator position only via the first guide section, and conversely the first actuator position can be reached from the locked position only via the second guide section.

The clutch can be arranged, for example, as a starter clutch between a drive motor and a step-by-step variable speed transmission of the motor vehicle drive train. Alternatively, the clutch can be provided as a power-shiftable clutch which can bring about a connection between a shaft and an idler gear which is rotatably mounted on this shaft, in particular in the manner described in document DE 199 17 724 A1, to the full extent of whose disclosed content reference is made here. The locking device which is described in this document is not suitable for large forces.

However, alternatively the clutch can also be used to move a brake or a parking brake into a locked position. In particular, it is possible to reverse the direction of action kinematically by closing the clutch in the first actuator position of an actuator section of the actuator arrangement, and opening it in the locked position of the actuator section.

In the method according to the invention it is advantageous if the locked position can be brought about solely by moving the actuator section beyond the closed position, with the result that the locked position can easily be brought about without a need to reverse the movement of the actuator section by applying a reversed actuator force.

In the method according to the invention, the actuator section is preferably coupled to the clutch via a spring arrangement, with the result that the step of movement in the forward direction beyond the closed position can be achieved by overcoming the spring arrangement.

The object is therefore completely achieved.

In the clutch arrangement according to the invention it is advantageous if the first guide section and the second guide section form a heart slotted link.

Such a heart slotted link is used, for example, in the field of ballpoint pen technology and is described by way of example in document DE 20 2008 013 348 U1, to whose disclosed content reference is made here.

According to one alternative embodiment, the first and second guide sections are each embodied in an L-shape and are arranged laterally one next to the other.

In this embodiment, a more compact design is obtained in the lateral direction of the guide sections. In addition, in this embodiment better protection against oscillations is achieved even in the case of relatively high excess pressure.

According to a further embodiment, which constitutes a separate invention irrespective of whether the slotted-link guide has a first and a second guide section, the locking device has a slotted-link guide for the actuator section, which slotted-link guide has a substantially axially oriented first guide duct, an adjoining, and substantially laterally oriented second guide duct and a substantially axially oriented third guide duct which adjoins the second guide duct.

The first and third guide ducts preferably at least partially overlap here in the longitudinal direction.

In this embodiment, the locked position can be brought about in that, starting from the first actuator position, the first guide duct is firstly passed through, subsequently the second guide duct and finally, in order to bring about the locked position, the third guide duct (the third guide duct in the opposite direction to the first guide duct) is passed through. In this context, the locked position can be set in the region of the third guide duct.

The overlapping region between the first guide duct and the third guide duct can correspond here to an excess pressure region or the region beyond the closed position in the forward direction.

The locked position can be located in the region of the third guide duct and can be held securely within this region, even in the case of vibrations in the region of the slotted-link guide.

The second guide duct, which is substantially transversely oriented and is preferably obliquely oriented with respect to the first guide duct here, preferably at an obtuse angle which is greater than 90°. For this reason it is possible for the slotted-link guide to rotate automatically with respect to the actuator section if a driver is pressed into the second guide duct in the forward direction by the first guide duct. As a result of this configuration it is possible to reach one end of the second guide duct by means of a pure forward movement of the actuator section, with the result that when the actuator force is switched off a movement of a driver of the actuator section into the third guide duct in the reverse direction is possible either by means of the actuator drive or preferably by means of a spring arrangement.

According to a further preferred embodiment, the actuator section of the actuator arrangement is a pressure section which is coupled to the clutch via a spring arrangement.

In this context, the actuator section is preferably a component via which the actuator force is transmitted from an actuator drive to the clutch. As a result of the arrangement of the spring arrangement between the pressure section and the clutch it is possible here to move the pressure section in a forward direction counter to an elastic deflection of the spring arrangement, beyond a closed position starting from which the clutch is closed.

Furthermore it is preferred if the actuator section is coupled to a rotary element of the clutch in the circumferential direction and in addition is coupled to an actuator drive via an axial bearing.

In this embodiment, the actuator section is embodied in such a way that it can for example be embodied as a part which can rotate on a shaft and which is rigidly coupled in the circumferential direction or rotational direction to a rotary element of the clutch which is also mounted in a rotational fashion with respect to the shaft.

By virtue of the measure of additionally coupling the actuator section to an actuator drive via an axial bearing, the actuator drive can be embodied in a stationary fashion, for example fixed to the housing.

The actuator drive may be a hydraulic drive here, but it can also be an electromotor drive or an electromagnet drive.

In addition it is advantageous overall if the actuator section has a first sleeve element which is arranged concentrically with respect to a longitudinal axis of the clutch.

By virtue of the embodiment as a sleeve element it is easily possible to arrange the latter concentrically with respect to the longitudinal axis of the clutch, in particular as sleeve about a shaft of a drive train.

In a corresponding way it is preferred if the slotted-link guide is formed on a second sleeve element which is arranged concentrically with respect to a longitudinal axis of the clutch.

The second sleeve element and the first sleeve element are arranged concentrically with respect to one another here in the manner of an inner sleeve and outer sleeve, with the result that a relative mobility between the first and second sleeve element can easily be predefined by the slotted-link guide.

The first sleeve element is mounted so as to be movable here in an axial direction as a pressure section. The second sleeve element is preferably fixed in the axial direction here.

It is particularly preferred here if the second sleeve element is rotatably mounted on a shaft.

In this embodiment, the second sleeve element can rotate with respect to the shaft. In addition it is preferred if a relative rotatability (within the scope of the slotted-link guide) is set up between the first and second sleeve elements.

The locking of the actuator section in the locked position can generally be effected by means of the slotted-link guide itself However, since relatively large forces (for example up to 20 kN) preferably act on the locking device, it is particularly preferred if the locking device has a mechanical blocking device for locking the actuator section, which blocking device is formed separately from the slotted-link guide.

As a result, the mechanical blocking device can be made stronger or more solid in order to be able to withstand the large forces when the locked position is brought about. In this case, the slotted-link guide only has to absorb the forces which are necessary for the relative movement and can to this extent be made more compact and lighter in weight.

In this context it is particularly preferred if the actuator section of the actuator arrangement has a toothing section which, in the locked position, engages behind an axially secured opposing toothing of the locking device.

Such toothing makes it possible to absorb the relatively large axial forces in the locked position.

In addition, such toothing can be embodied in such a way that an axial relative movement between the toothing section and the opposing toothing, predefined by the slotted-link guide, and a relative movement in the circumferential direction, predefined, if appropriate, by the slotted-link guide, in the circumferential direction are possible.

The opposing toothing is preferably formed here on the second sleeve element on which the slotted-link guide is also formed.

In addition, it is advantageous overall if the locking device is arranged concentrically and radially within the clutch.

In this way, an axially compact design can be obtained.

According to a further, overall preferred embodiment, the locking device is integrated into an actuator drive, in particular into a hydraulic cylinder.

Generally it is also possible to combine the locking device with an electric motor drive. However, when there is a hydraulic cylinder as an actuator drive, the locking device can preferably be accommodated in the interior of the cylinder housing of the hydraulic cylinder. In this context, the slotted-link guide is preferably arranged inside the cylinder housing. A pressure section is preferably connected rigidly to a piston of the hydraulic cylinder here, and a guide element is preferably mounted axially on the cylinder housing. The slotted-link guide is preferably formed between the pressure section and the guide element here, wherein the guide element can be embodied as a sleeve element.

By virtue of this embodiment it is possible to implement a particularly compact clutch arrangement.

In the method according to the invention it is preferred if the actuator section is firstly moved in the forward direction in order to exit the locked position.

As a result it is possible, for example, to release a toothing engagement between a toothing section and an opposing toothing.

In addition, in the method according to the invention it is preferred if the actuator section of the actuator arrangement is guided by means of a slotted-link guide in order to bring about and/or to exit the locked position, as has been described above.

The drive train according to the invention is preferably a drive train such as has been described basically in document DE 199 17 724 A1. In such a drive train with an electric motor as a drive motor, two different transmission ratios can be brought about by means of two clutches. One of the transmission ratios is here a gearspeed stage which is normally set during a majority of the customary driving operation, while the other gearspeed stage as a rule is applied only in special situations (for example accelerating on a slope or the like).

In such a drive train it is preferred if that clutch which is assigned to the gearspeed stage which is usually used is embodied as a clutch arrangement according to the invention with a locking function. For this reason, a driving mode can be predominantly implemented without a supply of energy, or with just a small supply of energy, to the actuator arrangement. The other clutch, which is assigned to the gearspeed stage which is used less, is preferably embodied without a locking function in this case.

Of course, the features which are mentioned above and which are still to be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and are explained in more detail in the following description, in which:

FIG. 1 shows a schematic longitudinal section through a first embodiment of a clutch arrangement according to the invention;

FIG. 2 shows a schematic sectional view along the line II-II in FIG. 1;

FIG. 3 shows a sectional view, comparable to FIG. 2, of an alternative embodiment of a slotted-link guide;

FIG. 4 shows a schematic view, corresponding to FIG. 3, with a further embodiment of a slotted-link guide;

FIG. 5 shows a schematic sectional view, corresponding to FIG. 2, with a further embodiment of a slotted-link guide;

FIG. 6 shows a schematic longitudinal sectional view through a further embodiment of a clutch arrangement according to the invention;

FIG. 7 shows a schematic longitudinal sectional view through a further embodiment of a clutch arrangement according to the invention;

FIG. 8 shows a schematic longitudinal sectional view through a further embodiment of a clutch arrangement according to the invention;

FIG. 12 shows a schematic longitudinal section through a further embodiment of a clutch arrangement according to the invention; and FIG. 13 shows a schematic longitudinal sectional view through a further embodiment of a clutch arrangement according to the invention.

DETAILED DESCRIPTION OF THE INVENTION

Figure 9:
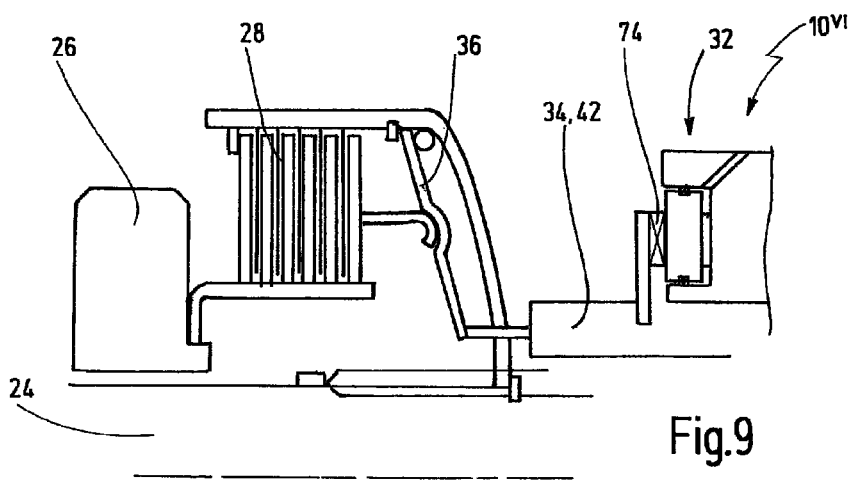
FIG. 9 shows a schematic longitudinal sectional view through a further embodiment of a clutch arrangement according to the invention.

In FIG. 1, a drive train for a motor vehicle is illustrated in the form of a schematic longitudinal section and is denoted generally by 10.

The drive train 10 has a drive motor 12 such as an internal combustion engine or an electric motor, a clutch arrangement 14, a step-by-step variable speed transmission 16 and a differential 18. A driveshaft of the drive motor 12 is connected to an input element (not denoted in more detail) of the clutch arrangement 14. An output element of the clutch arrangement 14 is connected to an input of the step-by-step variable speed transmission 16. An output of the step-by-step variable speed transmission 16 is connected to an input element of the differential 18. The differential 18 distributes the drive power between driveshafts 20L, 20R of a driven axle 22 of the drive train 10.

The clutch arrangement 14 is arranged on a shaft 24 which defines a longitudinal axis 25. An idler gear 26 is rotatably mounted on the shaft 24 and is connected, for example, to a fixed wheel of a further shaft and as a result brings about a transmission ratio of the step-by-step variable speed transmission 16. The input element of the clutch arrangement 14 is connected to the shaft 24, and the output element is connected to the idler gear 26.

The clutch arrangement 14 has a friction clutch in the form of a wet-running multi-disc clutch 28. The clutch 28 can be activated in an automated fashion by means of an actuator arrangement 30. For this purpose, the actuator arrangement 30 has a schematically indicated actuator drive 32 which can be formed, for example, by a hydraulic drive (piston/cylinder arrangement), by an electric motor or by an electromagnet arrangement. The actuator drive 32 generates an actuator force which is directed substantially parallel to the longitudinal axis 25.

In addition, the actuator arrangement 30 includes an actuator section which is embodied as a pressure section 34. The pressure section 34 is embodied as a first sleeve section which is arranged concentrically about the shaft 24. In addition, the pressure section 34 is coupled to the clutch 28 via a mechanical spring arrangement 36, for example in the form of an annular spring or disc spring.

The clutch 28 is embodied as a normally open clutch, wherein the spring arrangement 36 is preferably embodied in such a way that it relieves the loading on the disc pack of the friction clutch 28 in order to open the friction clutch 28. In order to close the friction clutch 28, an actuator force has to be applied which acts on the spring arrangement 36 via the pressure section 34 and in doing so compresses the discs of the disc pack of the clutch 28.

In addition, the clutch arrangement 14 contains a locking device 40. The locking device 40 has a second sleeve element 42. The second sleeve element 42 is arranged concentrically with respect to the shaft 24, specifically in a radial direction between the shaft 24 and the pressure section 34. The second sleeve element 42 is rotatably mounted on the shaft 24 and is secured with respect to the shaft 24 in the longitudinal direction by means of axial bearings (not denoted in more detail).

A slotted-link guide 44 is formed on the second sleeve element 42, preferably on an outer circumference of the second sleeve element 42. A driver of the pressure section 34 engages in the slotted-link guide 44, said driver being preferably embodied as a radially inwardly extending pin 46.

The locking device 40 also contains a mechanical blocking device 47 which is configured to secure the pressure section 34 in a locked position (to be described below) in the axial direction with respect to the second sleeve element 42, and in the process to absorb relatively large forces in the longitudinal direction. The mechanical blocking device 47 is provided separately from the slotted-link guide 44 and the pin 46. The mechanical blocking device 47 is preferably formed by a toothing engagement between a toothing section 48 of the pressure section 34 and an opposing toothing 50, which is preferably formed on the second sleeve element 42.

The pressure section 34 is mounted so as to be displaceable generally in the axial direction and in the rotational direction with respect to the second sleeve element 42. As a result, the relative mobility between the pressure section 34 and the second sleeve element 42 is substantially determined by the slotted-link guide 44.

FIG. 2 shows a schematic sectional view in the form of a developed view along the line II-II in FIG. 1.

It is initially apparent that the slotted-link guide 44 is of a substantially L-shaped design and in this embodiment has a first guide duct 52 which is arranged in the longitudinal direction and a second guide duct 54 which adjoins the first guide duct 52 and extends substantially transversely with respect to the first guide duct 52, preferably at an obtuse angle >90° and <180° with respect to the first guide duct 52.

In addition, the slotted-link guide 44 in this first embodiment includes a third guide duct 56, which is in turn oriented in the longitudinal direction and adjoins the second guide duct 54, specifically in such a way that it at least partially overlaps with the first guide duct 52.

In addition, FIG. 2 shows the pin 46 which can be moved within the slotted-link guide 44. In FIG. 2, the guide pin is here shown at 46 in a first actuator position of the pressure section 34, at which the clutch 38 is opened. In order to close the clutch, the pressure section 34 is moved in the axial direction, wherein the pin 46 firstly moves in the longitudinal direction here within the first guide duct 52. Approximately at the level of the overlapping region between the first and third guide ducts 52, 56, the clutch 28 is closed. A closed clutch is understood to mean here that the clutch can transmit a torque which can be of different magnitudes for the respective application case. The closed position is preferably understood to mean that the friction clutch can transmit its maximum permissible torque.

When the pin 46 reaches the junction with the second guide duct 54 (wherein the spring arrangement 36 is overcome), the second sleeve element 42 is rotated with respect to the pressure section 34 until the pin 46 is oriented with the third guide duct 56. In order to bring about a locked position, the pin 46 then moves in the reverse direction into the vicinity of an end of the third guide duct 56, specifically into a position which, when viewed in the forward direction, corresponds at least to the closed position. This is shown as 46' in FIG. 2.

FIG. 2 also shows the toothing section 48 and the opposing toothing 50. It is apparent that when the pin 46 moves within the first guide duct 52, the teeth of the toothing section 48 are guided through the opposing toothing 50 in order subsequently to move behind the opposing toothing as a result of the relative rotation. As a result of reverse movement of the pin 46 within the third guide duct 56 to the position 46', the toothing section 48 and the opposing toothing 50 enter into abutment. In other words, the toothing section 48 engages behind the opposing toothing 50. This results in the pin 46 within the third guide duct 56 not being guided to the end thereof, with the result that the pin 46 does not have to absorb any axial forces in the locked position. The locked position of the toothing section 48 is represented by dashed lines in FIG. 2.

In order to exit the locked position, the pressure section 34 is firstly moved in the forward direction and subsequently back to the position 46.

FIG. 3 shows a view of an alternative embodiment of a slotted-link guide, which is comparable to FIG. 2. The slotted-link guide 44' shown in FIG. 3 is embodied as a heart slotted link. The heart slotted link 44' includes here guide ducts 52-56, such as the slotted-link guide 54 in FIG. 2. In the transverse direction, the slotted link 44' is, however, expanded by a fourth guide duct 58, which adjoins the second guide duct 54 and is likewise oriented transversely. The fourth guide duct 58 is adjoined by a fifth guide duct 60 which runs approximately parallel to the first guide duct 52 and to the third guide duct 56 and which opens again into the first guide duct 52 via an oblique duct (not denoted in more detail). The locked position is brought about precisely in the same way as in the embodiment in FIG. 2. In order to exit the locked position, the pressure section 34 is firstly moved back in the forward direction, with the result that the pin 46 moves out of the third guide duct 56 and moves into abutment against the fourth guide section 58, as a result of which the second sleeve element 42 rotates further until the pin 46 is aligned with the fourth guide duct 58. If the actuator force is subsequently interrupted, the pin 46 within the fifth guide duct 60 moves back to the home position in the first guide duct 52. The corresponding relative movement between the toothing section 48 and the opposing toothing 50 is shown on the left in FIG. 3.

It is apparent here that the heart slotted 44' defines a first guide section 55 via which the locked position can be reached from the first actuator position. A second guide section 61, which is different therefrom, is defined by the heart slotted link 44' via which the first actuator position can be reached from the locked position.

In the following FIGS. 4 to 11, further embodiments of clutch arrangements and methods for activation thereof are described which correspond generally in terms of design and method of functioning to the clutch arrangements shown above with respect to FIGS. 1 to 3. Identical elements are therefore characterized by identical reference symbols. In the text which follows, the differences are basically explained.

In the slotted-link guide 44'' in FIG. 4, the third guide duct 56 is likewise of a slightly oblique design, and the junction between the third guide duct 56 and the fourth guide duct 58 is embodied with a heart-shaped tip, ensuring the unidirectionality of the guide sections 55, 61.

FIG. 4 also shows that the pin 46 firstly moves within the heart slotted link 44'' from a first actuator position 1 into a second actuator position 2 which represents the end of the first guide duct 52. From here, the pin 46 moves via the second guide duct 54 into the position 3, and from there via the third guide duct 56 into the position 4. From the position 4, which corresponds to the locked position, the pin 46 moves via the fourth guide duct 58 into the position 5, and from there back to the position 1 via an intermediate position 6. In addition, FIG. 4 shows that the individual teeth of the toothing section 48 can be provided with an oblique portion 64, wherein the individual teeth of the opposing toothing 50 have a corresponding oblique portion 64. In the locked position, the oblique portions 64, 66 come to bear one against the other and thereby prevent the toothings from moving in the circumferential direction from the position 4 into the position 3. This provides a relatively high level of stability of the locked position.

FIG. 5 shows a further alternative embodiment of a slotted-link guide 44''' which is composed of two L-shaped guide sections 55, 61 which are arranged laterally one next to the other. In this context, the guide pin 46 moves in a first guide duct 52 to the position 2 and from there via the second guide duct 54 to the position 3 and from there finally in the third guide duct 56 to the locked position 4. From here, the pin 46 moves in an axial forward direction to the position 5 into the second guide section 61, which has a fourth guide duct 58 which runs parallel to the second guide duct 54. From there, the guide pin 46 moves back to the position 1 via the positions 6 and 7.

The corresponding relative movements between a tooth of the opposing toothing 50 and a tooth of the toothing section 48 are also characterized by the corresponding positions 1 to 7 in FIGS. 4 and 5.

FIG. 6 shows a schematic longitudinal view, comparable to FIG. 1, of a further embodiment of a drive train $10^{IV}$, which corresponds to the drive train 10 in FIG. 1 in terms of the design and method of functioning.

In the embodiment in FIG. 6, the pressing section 34 is prestressed counter to the forward direction by means of a restoring spring 70 which is separate from the spring arrangement 36. The restoring spring 70 is arranged radially inside the friction clutch 28 here.

In addition, the actuator drive 32 has a piston 72 which is fixed to the housing and which can be activated hydraulically, and is coupled via an axial bearing 74 to the pressure section 34. A fluid feed to a cylinder space for the piston 72 is shown at 76.

In the embodiment in FIG. 6, as in the embodiment in FIG. 1, an outer disc carrier of the friction clutch 28 is connected to the idler gear 26, and an inner disc carrier is connected to the shaft 24.

FIG. 7 shows a further alternative embodiment, which corresponds to the embodiment in FIG. 6 in terms of design and method of functioning. In the drive $10^V$ in FIG. 7, the locking device 40 with the pressure section 34 and the second sleeve element 42 is arranged basically radially within, and axially aligned with, the clutch 28, wherein a restoring spring 70' in turn acts on the pressure section 34.

The spring arrangement 36 extends here between one end, facing the piston 72, of the pressure section 34 and the disc pack.

FIG. 8 shows a drive train $10^{VI}$, which corresponds in turn to the drive train $10^V$ in FIG. 7 in terms of design and method of functioning.

In the case of this embodiment, it is illustrated in more detail that the spring arrangement 36 is supported on a web which is connected to the inner disc carrier of the friction clutch 28, and that the spring arrangement 36 acts on the disc pack of the friction clutch 28 via a pressure element 77.

FIG. 9 shows a further alternative embodiment $10^{VI}$ in which an inner disc carrier of the friction clutch 28 is connected to the idler gear 26, and wherein an outer disc carrier is connected to the shaft 24. In this context, the spring arrangement 36 extends through a web which connects the outer disc carrier to the shaft 24.

Figure 10:
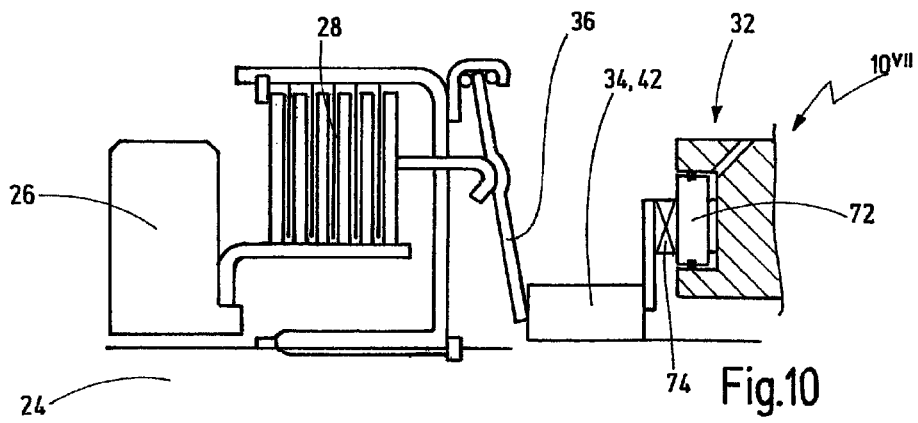
FIG. 10 shows a schematic longitudinal sectional view through a further embodiment of a clutch arrangement according to the invention.

FIG. 10 shows a further alterative embodiment of a drive $10^{VII}$, which corresponds generally to the embodiment in FIG. 9. While the spring arrangement 36 in the embodiment in FIG. 9 is arranged radially inside the outer disc carrier, the spring arrangement 36 in the embodiment in FIG. 10 is arranged axially adjacent to the cage which connects the outer disc carrier of the friction clutch 28 to the shaft 24, wherein a bearing for the spring arrangement 36 is formed axially on the outside of the cage.

Figure 11:
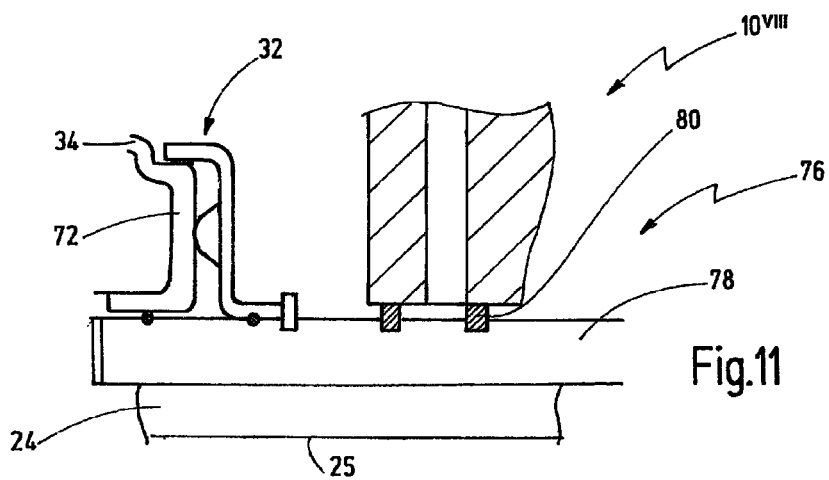
FIG. 11 shows a schematic longitudinal sectional view through an actuator drive of a further embodiment of a clutch arrangement according to the invention.

FIG. 11 shows an embodiment in which an actuator drive 32 is rotatably mounted on the shaft 24. In this context, the supply of fluid to the cylinder of the piston 72 occurs via a rotary feedthrough. In this case, the piston 72 can also be coupled to the pressure section 34 without an axial bearing.

In FIGS. 12 and 13, further alternative embodiments of drive trains $10^{IX}$, $10^X$ are shown in which the locking device is integrated into the actuator drive.

The drive train $10^{IX}$ in FIG. 12 corresponds here generally to the drive train $10^{VII}$ in FIG. 10 in terms of design and method of functioning. Identical elements are characterized by identical reference symbols. The differences are basically explained below.

In the drive train $10^{IX}$ in FIG. 12, the actuator drive 32 is formed by one (or more) hydraulic cylinders. The hydraulic cylinder has here a cylinder housing 84 which is fixedly secured to a drive train housing 86 like a clutch housing. A locking device is arranged in the interior of the cylinder housing 84, wherein a pressure section 34 is fixedly connected to a piston 72 of the hydraulic cylinder. An axial bearing 74 is provided on the outside of the piston 72, via which axial bearing 74 the piston 72 acts on a spring arrangement 86 by means of which the friction clutch 28 can be activated. The pressure section 34 is mounted, by means of a schematically indicated slotted-link guide 44, on a guide element 42 whose function corresponds to that of the second sleeve element 42. The guide element 42 is arranged inside the cylinder housing 84 and is secured axially to the cylinder housing 84.

The method of functioning of the drive train $10^{IX}$ in FIG. 12 corresponds to that of the embodiment in FIG. 10.

FIG. 12 also illustrates that a restoring spring 70 can be secured to an element of the clutch 28, which restoring spring 70 acts on the axial bearing 74, similarly to the function of the restoring spring 70 in FIGS. 6 and 7.

The drive train $10^X$ in FIG. 13 is a combination of the embodiments in FIGS. 11 and 12. In the embodiment in FIG. 13, the locking device 14 is also integrated into an actuator drive 32, in particular arranged in the interior of a cylinder housing 84, as in the embodiment in FIG. 12. In contrast to the embodiment in FIG. 12, the cylinder housing 84 is secured in a rotationally fixed fashion to the shaft 24, wherein the second sleeve element 42 is secured axially to the shaft 24, but it can rotate with respect to the latter, as in the embodiment in FIG. 1.

In this embodiment, the piston 72 of the hydraulic cylinder presses directly, without intermediate connection of an axial bearing, on the spring arrangement 36 by means of which the clutch 28 is activated.

As in the embodiment in FIG. 12, a restoring spring 70 can also be arranged between an element of the clutch 28 and the piston 72 here.

Instead of an individual restoring spring 70, a multiplicity of restoring springs distributed over the circumference can also be provided here. This also applies to the preceding embodiments, for example also to the embodiment in FIG. 1.

The embodiments in which the locking device is integrated into the actuator drive are advantageous, in particular in the case of concentric double-clutch arrangements. The clutches of such a double-clutch arrangement such as a double-clutch transmission are preferably interleaved radially one in the other here and oriented approximately axially with respect to one another. The respective hydraulic cylinders are then located in the axial direction next to the latter and can likewise be interleaved radially and oriented axially with respect to one another.

What is claimed is:

1. Clutch arrangement for connecting two components, which can rotate relative to one another, of a motor vehicle drive train, having a clutch, having an actuator arrangement for activating the clutch, wherein the clutch is opened in a first actuator position of an actuator section of the actuator arrangement, and having a locking device for locking the actuator section in a locked position, in order to keep the clutch closed,
    wherein the locking device has a slotted-link guide with a first guide section and a second guide section for the actuator section, wherein the locked position can be reached from the first actuator position via the first guide section, wherein the first actuator position can be reached from the locked position via the second guide section, and wherein the first guide section and the second guide section are each embodied in an L-shape and are arranged laterally one next to the other.

2. Clutch arrangement according to claim 1, wherein the first guide section and the second guide section form a heart slotted link.

3. Clutch arrangement according to claim 1, wherein the locking device has a slotted-link guide for the actuator section, which slotted-link guide has a substantially axially oriented first guide duct, an adjoining, and substantially laterally oriented second guide duct and a substantially axially oriented third guide duct which adjoins the second guide duct.

4. Clutch arrangement according to claim 1, wherein the actuator section of the actuator arrangement is a pressure section which is coupled to the clutch via a spring arrangement.

5. Clutch arrangement according to claim 1, wherein the actuator section is coupled to a rotary element of the clutch in the circumferential direction and is coupled to an actuator drive via an axial bearing.

6. Clutch arrangement according to claim 1, wherein the actuator section has a first sleeve element which is arranged concentrically with respect to a longitudinal axis of the clutch.

7. Clutch arrangement according to claim 6, wherein the slotted-link guide is formed on a second sleeve element which is arranged concentrically with respect to a longitudinal axis of the clutch.

8. Clutch arrangement according to claim 7, wherein the second sleeve element is rotatably mounted on a shaft.

9. Clutch arrangement according to claim 1, wherein the locking device is arranged concentrically and radially within the clutch.

10. Clutch arrangement according to claim 1, wherein the locking device is integrated into an actuator drive.

11. Clutch arrangement, for connecting two components, which can rotate relative to one another, of a motor vehicle drive train, having a clutch, having an actuator arrangement for activating the clutch, wherein the clutch is opened in a first actuator position of an actuator section of the actuator arrangement, and having a locking device for locking the actuator section in a locked position, in order to keep the clutch closed,
    wherein the locking device has a slotted-link guide with a first guide section and a second guide section for the actuator section, wherein the locked position can be reached from the first actuator position via the first guide section, wherein the first actuator position can be reached from the locked position via the second guide section, and wherein the locking device has a mechanical blocking device for locking the actuator section, wherein the blocking device is formed separately from the slotted-link guide.

12. Clutch arrangement according to claim 11, wherein the actuator section of the actuator arrangement has a toothing section which, in the locked position, engages behind an axially secured opposing toothing of the locking device.

13. Clutch arrangement for connecting two components, which can rotate relative to one another, of a motor vehicle drive train, having a clutch, having an actuator arrangement for activating the clutch, wherein the clutch is opened in a first actuator position of an actuator section of the actuator arrangement, and having a locking device for locking the actuator section in a locked position, in order to keep the clutch closed,
    wherein the locking device has a slotted-link guide for the actuator section, which slotted-link guide has a substantially axially oriented first guide duct, an adjoining, and substantially laterally oriented second guide duct and a substantially axially oriented third guide duct which adjoins the second guide duct, wherein the locking device has a mechanical blocking device for locking the actuator section, and wherein the blocking device is formed separately from the slotted-link guide.

14. Clutch arrangement according to claim 13, wherein the actuator section of the actuator arrangement is a pressure section which is coupled to the clutch via a spring arrangement.

15. Clutch arrangement according to claim 13, wherein the actuator section is coupled to a rotary element of the clutch in the circumferential direction and is coupled to an actuator drive via an axial bearing.

16. Clutch arrangement according to one of claim 13, wherein the actuator section has a first sleeve element which is arranged concentrically with respect to a longitudinal axis of the clutch.

17. Clutch arrangement according to claim 16, wherein the slotted-link guide is formed on a second sleeve element which is arranged concentrically with respect to a longitudinal axis of the clutch.

18. Clutch arrangement according to claim 13, wherein the locking device is arranged concentrically and radially within the clutch.

19. Clutch arrangement according to claim 13, wherein the locking device is integrated into an actuator drive.

\* \* \* \* \*

UNITED STATES PATENT AND TRADEMARK OFFICE
CERTIFICATE OF CORRECTION

| | | |
|---|---|---|
| PATENT NO. | : 8,905,215 B2 | Page 1 of 1 |
| APPLICATION NO. | : 13/604591 | |
| DATED | : December 9, 2014 | |
| INVENTOR(S) | : Hansi Gremplini | |

It is certified that error appears in the above-identified patent and that said Letters Patent is hereby corrected as shown below:

Specification

In column 4 at line 56, Change "itself" to --itself.--.

Claims

In column 12 at line 25, In Claim 11, change "arrangement," to --arrangement--.

In column 13 at line 5, In Claim 16, after "to" delete "one of".

Signed and Sealed this
Thirteenth Day of October, 2015

Michelle K. Lee
*Director of the United States Patent and Trademark Office*